June 8, 1943.  J. D. TYLER  2,321,438
VARIABLE SPEED PULLEY
Filed Feb. 25, 1942
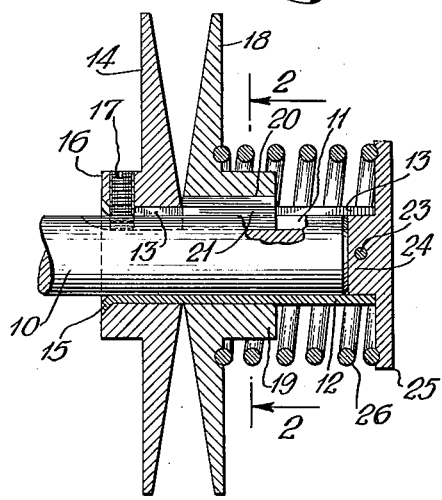
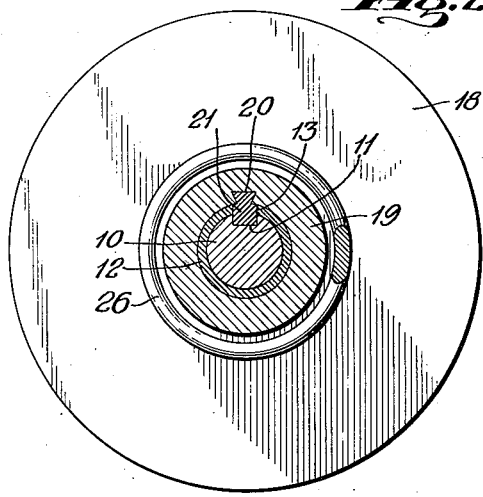
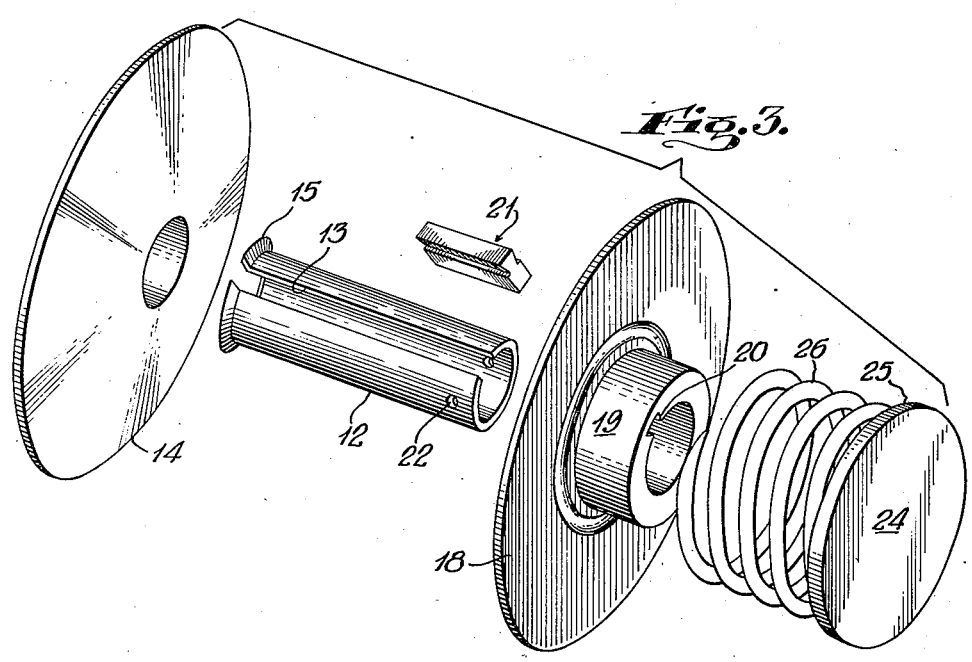
INVENTOR
John D. Tyler
BY
ATTORNEY Patented June 8, 1943

2,321,438

UNITED STATES PATENT OFFICE 2,321,438

VARIABLE SPEED PULLEY

John Duke Tyler, Nashville, Tenn.

Application February 25, 1942, Serial No. 432,218

12 Claims. (Cl. 74—230.17)

This invention relates to a variable speed pulley of the type shown in the Reeves Patent Re. 18,333. Pulleys of the particular class comprise an assembly adapted for application as a unit to the shaft of a motor or other driven device.

My invention has as its most important feature the arrangement of a minimum number of elements of inexpensive form, assembled so as to yield a very effective variable pulley unit, with a maximum range of speed variations.

As a feature of my invention, I utilize a sleeve and a fixed flange, both of which are adapted to be secured to the keyway of the shaft on which the pulley unit is mounted. As a further feature of my invention, I utilize a sleeve as the main supporting member of my variable pulley, and use with this sleeve a movable flange that is not only keyed to the sleeve, but is also keyed to the shaft on which the sleeve is mounted. Even more particularly, I utilize one key for keying both the sleeve and the movable flange to the shaft.

I have thus described my invention generally in order that the particular detailed mechanism which I shall hereinafter set forth will be better understood. Naturally, the specific form of my invention is merely suggestive, and other forms thereof may be utilized to carry out the particular purposes, as will be readily apparent to those skilled in the art.

Referring now more particularly to the drawing, Fig. 1 is a diametric section through the variable pulley of my invention, showing it applied to a motor shaft. Fig. 2 is a section taken along lines 2—2 of Fig. 1. Fig. 3 is an exploded view of the several parts of my variable pulley unit.

Referring now more particularly to the drawings, reference numeral 10 indicates a motor shaft to which my pulley is to be applied, the motor shaft having a keyway designated by reference numeral 11. The sleeve which forms the base member of my variable pulley unit is best shown in Fig. 3 wherein it is designated by reference numeral 12. It has a slot 13 that runs preferably for the entire length of the sleeve, and is adapted naturally to coincide with the keyway 11 when the sleeve is applied to the shaft 10. The fixed flange of my pulley is indicated by reference numeral 14, and is adapted to fit on the sleeve 12, and to be held by the staked-over or flanged portion 15 of the sleeve, as is best indicated in Fig. 1.

The hub 16 of the flange 14 is threaded for the screw stud 17. As is quite apparent, the screw stud 17 is adapted to traverse the slot 13 of the sleeve 12 and to enter the keyway 11 of the shaft 10 for securing the sleeve 12 and the fixed flange 14 to the shaft 10 for rotation therewith. This utilization of the screw stud 17 for securing both the flange 14 and the sleeve 12 to the shaft 10, forms an important feature of my invention.

My variable pulley utilizes a movable sliding flange 18 which is formed with a hub 19 for sliding movement on the sleeve 12. The flange 18 and the hub 19 are formed with a dovetail shaped keyway 20 for cooperation with the key 21, it being understood that the key 21 will lie within the keyway 20 and will extend through the slot 13 of the sleeve 12 and into the keyway 11 of the shaft 10, as is probably best seen from Fig. 1. It will further be noted that the shape of the key 21 is such relatively to keyway 20 that it will be retained in the keyway 20 so as to remain in assembled relation to the flange 18.

It will now be readily understood that at all times the movable flange 18 and the sleeve 12 will both be keyed to the shaft 10 through the utilization of the keyway 11 and the single key 21. It is possible therefore to use the relatively thin sleeve 12 because no great structural strength is required of the sleeve, both flanges being really secured directly to the shaft. In the prior art structures the sleeve functions as a coupling element between the flanges and the shaft and must be quite large to perform its functions. The thin sleeve 12 makes it possible for the belt which operates between the flanges 14 and 18 to move very closely to the shaft 10 when the flanges are separated. The belt moves away from the shaft 10 when the flanges 14 and 18 are brought closely together, all as is well appreciated by those skilled in the art. This naturally makes it possible to vary to a maximum degree the speed with which the pulley will be driven by a belt lying between the flanges 14 and 18.

The sleeve 12 is drilled as at 22 for a pin 23 which secures to the sleeve an end abutment 24 that extends in the form of a disc 25. Lying between disc 25 and the flange 18 is a compression spring 26, which as can readily be seen in Fig. 1, urges the movable flange 18 into a position against the fixed flange 14. Naturally, the belt which operates between the flanges will be adapted to move the sliding or movable flange 18 against the pressure of the spring 26 in the usual manner understood by those skilled in the art.

I now claim:

1. In a variable speed pulley unit, a sleeve, said sleeve having an opening for alignment with the keyway of a shaft to which said sleeve is to be applied, a flange at one end of said sleeve, a screw stud threaded relatively to said flange and adapted to extend through said opening in the sleeve and into the shaft keyway whereby to fix said flange and sleeve to said keyway, a movable flange slidably mounted on said sleeve, an abutment fixed to the end of said sleeve opposite said first flange, and a spring between said abutment and said movable flange for pressing said movable flange toward said first flange.

2. In a variable speed pulley unit, a sleeve, said sleeve having an opening for alignment with the keyway of a shaft to which said sleeve is to be applied, a flange at one end of said sleeve, means extending from said flange and through said sleeve opening and into the shaft keyway whereby to secure said sleeve and flange against rotation relatively to said shaft, a movable flange slidably mounted on said sleeve, and a spring for pressing said movable flange toward said fixed flange.

3. In a variable speed pulley unit, a sleeve, said sleeve having an opening for alignment with the keyway of a shaft to which said sleeve is to be applied, a flange secured to one end of said sleeve as by the staking over of the sleeve relatively to said flange, a screw stud threaded relatively to said flange and adapted to extend through said opening in the sleeve and into the shaft keyway whereby to fix said flange and sleeve to said keyway, a movable flange slidably mounted on said sleeve, and a spring for pressing said movable flange toward said first flange.

4. In a variable speed pulley unit, a sleeve, a flange, means fixing said flange on said sleeve, said sleeve having a slot for alignment with the keyway of a shaft to which said sleeve is to be applied, a movable flange mounted about said sleeve and having a keyway adapted for alignment with the slot of said sleeve, a key in said keyway and slot for keying said movable flange to said sleeve and for sliding movement on said sleeve, a portion of said key protruding inwardly of said sleeve whereby to enter the keyway of the shaft, an abutment fixed to the end of said sleeve opposite said first flange, and a spring between said abutment and said movable flange for pressing said movable flange toward said first flange.

5. In a variable speed pulley unit, a sleeve, a flange, means fixing said flange to said sleeve, said sleeve having a slot for alignment with the keyway of a shaft to which said sleeve is to be applied, a movable flange mounted about said sleeve and having a keyway adapted for alignment with the slot of said sleeve, a key in said keyway and slot for keying said movable flange to said sleeve and for sliding movement on said sleeve, a portion of said key protruding inwardly of said sleeve whereby to enter the keyway of the shaft, and a spring for pressing said movable flange toward said fixed flange.

6. In a variable speed pulley unit, a sleeve, said sleeve having a slot for alignment with the keyway of a shaft to which said sleeve is to be applied, a flange on said sleeve, a screw stud threaded relatively to said flange and adapted to extend through said slot in the sleeve and into the shaft keyway whereby to fix said flange and sleeve to said keyway, a movable flange mounted about said sleeve and having a keyway adapted for alignment with the slot of said sleeve, a key in said keyway and slot for keying said movable flange to said sleeve, a portion of said key protruding inwardly of said sleeve whereby to enter the keyway of the shaft, an abutment fixed to the end of said sleeve opposite said first flange, and a spring between said abutment and said movable flange for pressing said movable flange toward said first flange.

7. In a variable speed pulley unit, a sleeve, said sleeve having a slot for alignment with the keyway of a shaft to which said sleeve is to be applied, a flange on said sleeve, a screw stud threaded relatively to said flange and adapted to extend through said slot in the sleeve and into the shaft keyway whereby to fix said flange and sleeve to said keyway, a movable flange mounted about said sleeve and having a keyway adapted for alignment with the slot of said sleeve, a key in said keyway and slot for keying said movable flange to said sleeve, a portion of said key protruding inwardly of said sleeve whereby to enter the keyway of the shaft, an abutment fixed to the end of said sleeve opposite said first flange, and a spring for pressing said movable flange toward said fixed flange.

8. In a variable speed pulley unit, a sleeve, said sleeve having a slot for alignment with the keyway of a shaft to which said sleeve is to be applied, a flange on said sleeve, means extending from said flange and through said sleeve slot and into the shaft keyway whereby to secure said sleeve and flange against rotation relatively to said shaft, a movable flange mounted about said sleeve and having a keyway adapted for alignment with the slot of said sleeve, a key in said keyway and slot for keying said movable flange to said sleeve, a portion of said key protruding inwardly of said sleeve whereby to enter the keyway of the shaft, an abutment fixed to the end of said sleeve opposite said first flange, and a spring between said abutment and said movable flange for pressing said movable flange toward said first flange.

9. In a variable speed pulley unit, a sleeve, a flange, means fixing said flange to said sleeve, said sleeve having a slot for alignment with the keyway of a shaft to which said sleeve is to be applied, a movable flange mounted about said sleeve and having a keyway adapted for alignment with the slot of said sleeve, a key in said keyway and slot for keying said movable flange to said sleeve, a portion of said key protruding inwardly of said sleeve whereby to enter the keyway of the shaft, the portion of said key in said movable flange keyway being formed so as to be retained by said movable flange when the unit is not applied to a shaft.

10. In a variable speed pulley unit adapted to be applied to a shaft formed with a keyway, a sleeve having a slot for alignment with the keyway of the shaft, a pair of flanges on said shaft, a keyway in one of said flanges adapted for alignment with the keyway of said sleeve and the keyway of said shaft, and a key having a portion lying in the keyway of said flange, and further portions in the slot of said sleeve and in the keyway of said shaft whereby to lock said flange and sleeve for rotation with said shaft while permitting sliding of said flange relatively to said shaft.

11. In a variable speed pulley unit adapted to be applied to a shaft formed with a keyway, a sleeve having a slot for alignment with the keyway of the shaft, a pair of flanges on said shaft, a keyway in one of said flanges adapted for alignment with the keyway of said sleeve and the keyway of said shaft, and a key having a portion lying in the keyway of said flange, and further portions in the slot of said sleeve and in the keyway of said shaft whereby to lock said flange and sleeve for rotation with said shaft while permitting sliding of said flange relatively to said shaft, means fixing the other flange to said sleeve, and a spring mounted on said sleeve and pressing the first flange against said other flange.

12. In a variable speed pulley unit adapted to be applied to a shaft formed with a keyway, a sleeve having a slot for alignment with the keyway of the shaft, a pair of flanges on said shaft, a keyway in one of said flanges adapted for alignment with the keyway of said sleeve and the keyway of said shaft, and a key having a portion lying in the keyway of said flange, and further portions in the slot of said sleeve and in the keyway of said shaft whereby to lock said flange and sleeve for rotation with said shaft while permitting sliding of said flange relatively to said shaft, means fixing the other flange to said sleeve and extending into the shaft keyway through said sleeve slot to secure said sleeve to said shaft, and a spring mounted on said sleeve and pressing the first flange against said other flange.

JOHN D. TYLER.